No. 829,121. PATENTED AUG. 21, 1906.
E. NEUMAYER & H. JACOB.
TELESCOPE FOR SUBMARINE AND SUBMERGIBLE BOATS.
APPLICATION FILED JUNE 24, 1905.
3 SHEETS—SHEET 3.
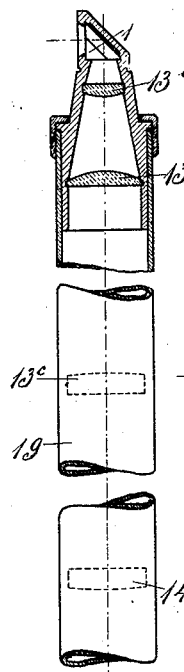
*Fig. 7*
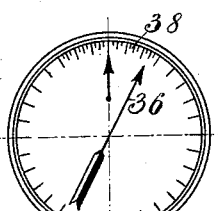
*Fig. 9*
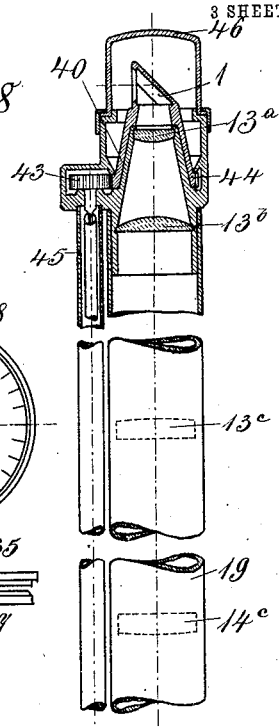
*Fig. 8*
*Fig. 10*
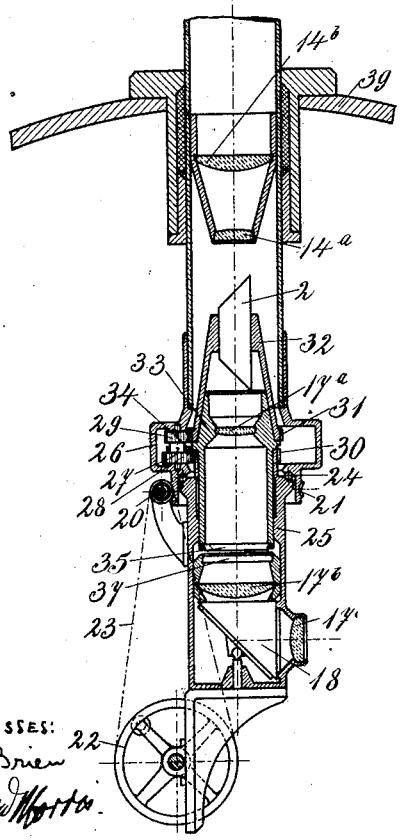
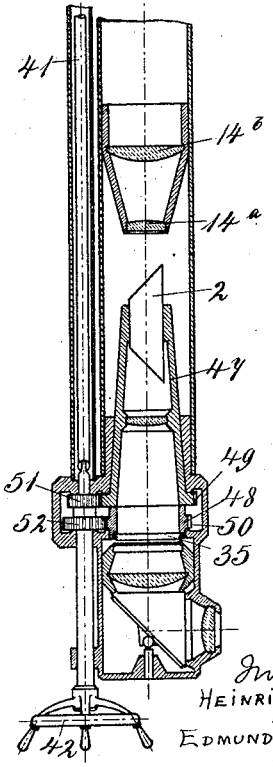
WITNESSES:
A. L. O'Brien
Herman Morris
Inventors
HEINRICH JACOB
AND
EDMUND NEUMAYER
by
Dickerson, Brown, Raegener & Binney
attys

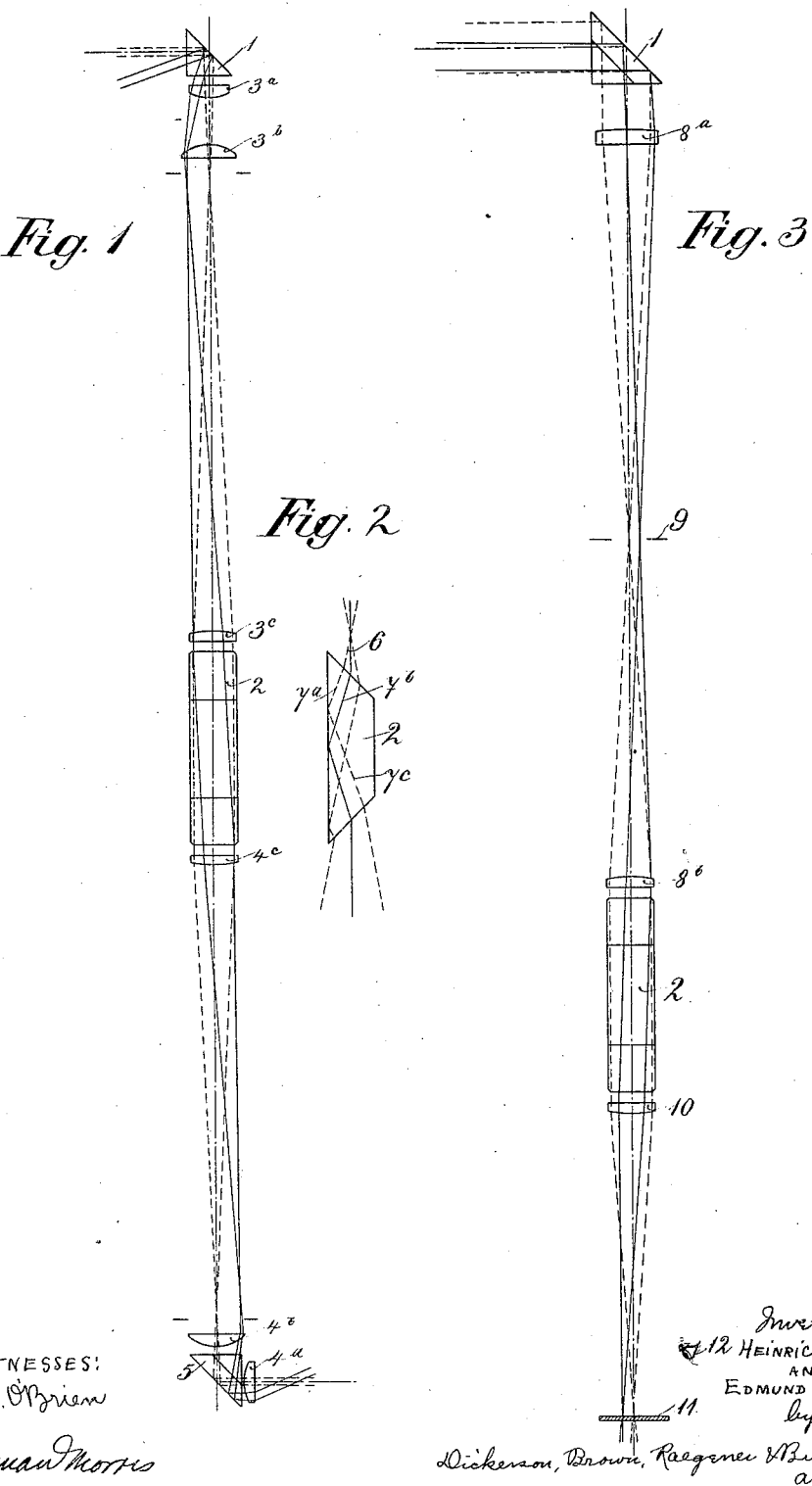

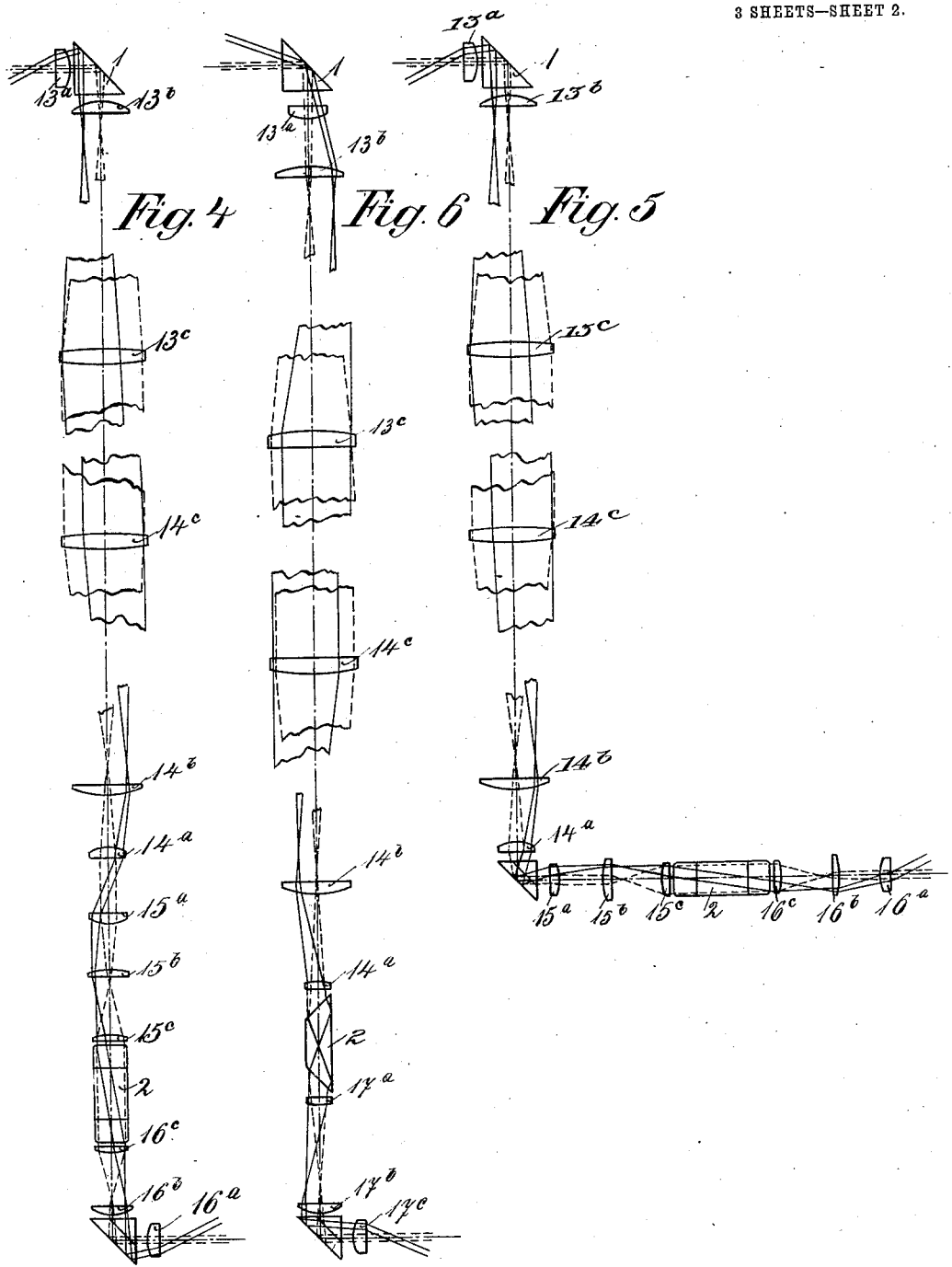

UNITED STATES PATENT OFFICE.

EDMUND NEUMAYER AND HEINRICH JACOB, OF FRIEDENAU, NEAR BERLIN, GERMANY, ASSIGNORS TO THE FIRM OF OPTISCHE ANSTALT C. P. GOERZ AKTIENGESELLSCHAFT, OF FRIEDENAU, NEAR BERLIN, GERMANY.

TELESCOPE FOR SUBMARINE AND SUBMERGIBLE BOATS.

No. 829,121.   Specification of Letters Patent.   Patented Aug. 21, 1906.

Application filed June 24, 1905. Serial No. 266,728.

*To all whom it may concern:*

Be it known that we, EDMUND NEUMAYER and HEINRICH JACOB, engineers, citizens of the German Empire, and residents of Friedenau, near Berlin, Germany, have invented certain new and useful Improvements in Telescopes for Submarine and Submergible Boats, Turrets, and Similar Purposes, of which the following is a specification.

This invention relates to a telescope for submarine and submergible boats, turrets, and similar purposes where distant objects either cannot be directly seen at all or only by exposing the observer to danger. More particularly the invention relates to those telescopes of the said kind where a rotatable reflector or combination of reflectors is inserted into the path of the rays adapted to sweep the horizon and where a further system of reflectors, preferably forming faces of a prism, is provided, which is or are likewise rotatable and adapted to coöperate with the said first-named reflector sweeping the horizon in such a manner that correct upright images are thrown into the eye of an observer who remains stationary at his position during the rotation of the said reflectors. Telescopes of this kind are described in United States Patent Nos. 784,487 and 784,852, issued to the assignee of this invention, the firm of C. P. Goerz, of Friedenau, near Berlin.

The invention has for its object certain improvements in and relating to said telescopes with rotatable reflector sweeping the horizon and with image-erecting prism or prisms, said improvements consisting mainly in means for obtaining a large field of view with said instruments and for enabling the determinations of the position of the said reflector sweeping the horizon at the same time with the sighting of the distant object through the instrument.

Other objects of the invention consisting in certain features of construction resulting in an instrument which is at the same time strong and can be easily manipulated by the observer will be clear from the following description.

In the accompanying drawings, Figure 1 is a diagrammatical view of the optical constituents of a telescope in accordance with the invention, having two telescopical systems, the figure showing at the same time the path of the axial ray of the instrument and of lateral rays of two pencils of rays. Fig. 2 is a view of the erecting-prism of Fig. 1, seen in a direction forming an angle of ninety degrees to that of Fig. 1. Fig. 3 is a modification of the optical constituents of the instrument. Fig. 4 is another modification, the instrument containing in this instance four telescopical systems. Fig. 5 is a modification of the instrument containing the same four telescopical systems as Fig. 4, the common optical axis of two of the systems forming an angle of ninety degrees with the common optical axis of the other two systems. Fig. 6 is a modification of the instrument containing three telescopical systems. Figs. 7 and 8 are embodiments of two forms of instruments with three telescopical systems. Figs. 9 and 10 are detail views of the devices for indicating the position of the reflector sweeping the horizon.

Referring more particularly to Fig. 1 of the drawings, 1 designates the rotatable reflector sweeping the horizon. 2 is the image-erecting rotatable prism. The lenses $3^a$ $3^b$ $3^c$ form one telescopical system, the lens $3^c$ being the element of greater focal length, the lenses $4^a$ $4^b$ $4^c$ forming the second telescopical system, the lens $4^c$ being the element of greater focal length. The numeral 5 designates a fixed prism refracting and reflecting the rays in a substantially horizontal direction.

From the construction of the path of rays shown in Fig. 2 it can be seen that the angle 6, included between two marginal rays of a pencil which can pass through the prism 2, cannot surpass certain narrow limits, depending essentially on the refracting power of the glass which is used for manufacturing the prism. Therefore in order to obtain a large field of view for an instrument having an erecting-prism like the prism 2 inserted in the path of the rays it is necessary to reduce the angle included between two rays coming from the object to be viewed through the instrument before same meet the erecting-prism 2. This is done in accordance with the invention by the telescopical system $3^a$ $3^b$ $3^c$, in which the lens $3^c$ forms the element of greater focal length, because it is a well-known fact that the angle which is included between two rays leaving the element of greater focal length of a telescopical system is smaller than the angle between the same two rays before same enter the element of smaller focal length of the said telescopical system. However, the inserting of a telescopical system in the path of the rays in front of the erecting-prism would result in a reducing of the size of the image obtained from the object to be sighted. This would often be disadvantageous. Therefore a second telescopical system is inserted behind the erecting-prism, this second telescopical system consisting in the embodiment of invention illustrated in Fig. 1 of the prisms $4^a$ $4^b$ $4^c$ turns its element of greater focal length toward the erecting-prism, so that the latter is included between the elements of greater focal length of the said two telescopical systems. The use of two telescopical systems in the instrument enables at the same time any desired variation of the length of the instrument, because it is possible to remove or to bring nearer together the telescopical systems without altering the images produced by the instrument.

In Fig. 3 a modification of the optical elements represented in Fig. 1 is shown. In this instance the rotatable reflector sweeping the horizon is again designated with the numeral 1.

The first telescopical system inserted in the path of the rays consists of two collective lenses $8^a$ and $8^b$, the lens $8^a$ producing an image in the plane 9 and the lens $8^b$ emitting the rays coming from the image in plane 9 in parallel direction. The erecting-prism is again designated with the numeral 2. The telescopical system behind the erecting-prism 2 is reduced to one single collective lens 10, having its focal plane at 11 and producing an image at this plane. It is assumed that the image produced in plane 11 is inspected directly by the eye 12 of the observer.

Although the insertion of a telescopical system in front of the erecting-prism 2 enables theoretically obtaining of large fields of view, yet practically the field of view is limited by the difficulty met in producing erecting-prisms of sufficient size. This difficulty results from the fact that the telescopical system arranged in front of the erecting-prism turns its element of greater focal length toward the erecting-prism and this element having a considerable diameter in the case where the focal length is considerable, as it must be in instruments which are used for submarine boats and similar purposes. In order to meet this difficulty, besides two telescopical systems having elements of considerable focal length and in connection with this large diameter, telescopical systems with elements of small focal length may be used, and the erecting-prism may be inserted between two of such additional telescopical systems or in front of one such additional telescopical system. Such modifications of the telescope in accordance with this invention are represented in Figs. 4, 5, and 6 of the drawings. In Figs. 4 to 6 the rotatable reflector or prism sweeping the horizon is again designated with the numeral 1. The lenses of the two telescopical systems which are adapted to give a considerable length to the whole instrument are designated $13^a$ $13^b$ $13^c$ and $14^a$ $14^b$ $14^c$. The lenses of the two additional telescopical systems are designated in Figs. 4 and 5, $15^a$ $15^b$ $15^c$ and $16^a$ $16^b$ $16^c$.

The erecting-prism 2 is inserted between the systems 15 and 16. From the annexed drawings it can easily be seen that the size of the erecting-prism 2, inserted between such additional telescopical systems, can be much smaller than if such prism had been inserted between the two systems 13 and 14. The two embodiments of the instrument in Figs. 4 and 5 are only distinguished in so far that the systems 15 and 16 are arranged in Fig. 5 in an angle of ninety degrees to the systems 13 and 14, whereas in Fig. 4 the lenses of all the telescopical systems except one lens at each end of the instrument are arranged in a straight line. In the embodiment of the invention represented in Fig. 6 the erecting-prism is arranged between the element $14^a$ of smaller focal length of the telescopical system 14 and the telescopical system $17^a$ $17^b$ $17^c$. This last-named telescopical system is used in this instance to eliminate the diminution of the field of view produced by the inserting of the two telescopical systems 13 and 14, turning their elements of greater focal length $13^c$ and $14^c$ toward each other.

In Figs. 7 and 8 two embodiments of the instrument with optical elements as represented in Fig. 6 are shown. In the embodiment of the instrument represented in Fig. 7 the two telescopical elements which enable a great length of the instrument to be obtained are again designated by the numerals $13^a$ $13^b$ $13^c$ and $14^a$ $14^b$ $14^c$, as in Fig. 6. The lenses of the third telescopical system are also designated with the numerals $17^a$, $17^b$, and $17^c$, as in Fig. 6. The rotatable prism with the reflecting-surface sweeping the horizon is designated 1 and the erecting-prism 2. 18 designates a prism with a reflecting-surface which is so arranged that it reflects the luminous rays passing through the instrument in horizontal direction, so that they can easily be observed by an observer.

The prism 1 is firmly connected with a rotatable tube 19, which is driven by a worm 20, engaging a worm-wheel 21, firmly connected with the tube 19. The worm 20 may be rotated by a hand-wheel 22, which is connected with the worm 20 by a cord 23. The tube 19 is mounted with a ball-bearing 24 on a fixed part 25 of the instrument. The two telescopical systems 13 and 14 are firmly connected with the rotatable tube 19. In an extension 26 of the tube 19 an axle 27 is mounted bearing two toothed wheels 28 29, one of which meshes with the teeth of a rack 30 on the periphery of the fixed part 25 of the instrument. The other wheel 29 meshes with the teeth of a gear 31 on the periphery of a rotatable cap 32, carrying the erecting-prism 2. The carrier 32 of the prism 2 is rotatably mounted on a tube-like part 33, rotatably inserted in the hollow of the fixed part 25 and provided with a nose 34, engaging the axle 27, carrying the toothed wheels 28 29. In the rotatable tube-like part 33 a glass plate 35 is inserted carrying an index or pointer 36. Another glass plate 37 with a dial 38 is inserted into the hollow of the fixed part 25 of the instrument. The two glass plates 35 37 are so arranged that their planes containing the said pointer 36 and dial 38 substantially coincide with the focal plane of the ocular 17° of the instrument. The numeral 39 indicates a plate-form of a submarine boat or the like which is traversed by the upper end of tube 19.

The operation of this embodiment of the instrument is as follows:

The observer, looking through the eyeglass 17° of the instrument, observes the objects in front of the reflecting-prism 1. In order to observe the objects at different points of the horizon, he must rotate the hand-wheel 22, which communicates its movements by rope 23 to worm 20, worm-wheel 21 to tube 19, carrying the reflector 1. Therefore a rotation of the hand-wheel 22 corresponds to a rotation of the reflector 1. This rotation of the tube 19 and reflector 1 is communicated through the axle 27, engaging with nose 34, to the part 33, rotatably inserted into the hollow of the fixed part 25 of the instrument. Therefore the pointer 36 rotates over the dial 38 and indicates by its position the position of the rotatable reflecting-prism 1 and the position of the object in front of said rotatable prism 1. The dial 38 and the pointer 36 being arranged in the focal plane of the ocular 17°, the observer can determine the position of the rotatable prism, without leaving the ocular 17°, by his eye. The rotation of the tube 19 is communicated by the rack 30 to the toothed wheels 28 and 29, fixed on the axle 27, mounted in the extension 26 of tube 19. The wheel 29, engaging the toothed periphery 31 of the carrier 32, rotatably mounted on part 33, communicates this rotation to said part 32 and the prism 2 carried thereby. The gears 27 29 are so proportioned that the head 32 with prism 2 is rotated with half the angular velocity of the reflecting-prism 1. By such relation of the angular velocities of prisms 1 and 2 upright images are secured for each position of the rotatable reflecting-prism 1, as clearly shown in the above-mentioned former patents Nos. 784,487 and 784,852.

The modification of the instrument shown in Fig. 8 differs from the embodiment shown in Fig. 7 substantially in this regard that the tube 19, carrying the two telescopical systems 13 and 14, is stationary and that only the reflecting-prism 1 is rotatably mounted on the upper end of said stationary tube 19. Motion is communicated to the rotatable carrier 40 of said prism 1 by a rod 41, carrying at its lower end within the reach of the observer a hand-wheel 42 and at its upper end a toothed wheel 43, meshing with teeth on the periphery 44 of the carrier 40. The rod 41 is tightly inclosed by a tube 45. A transparent cap 46 tightly encircles the rotatable reflecting-prism 1. The erecting-prism 2 is firmly mounted in the tube-like head 47, rotatably secured in stationary tube 19, whereas the glass plate 35 with pointer 36 is inserted into a rotatable part 48. The rotatable pieces 47 and 48 are provided at their peripheries with rows of teeth 49 and 50, respectively, said teeth meshing with toothed wheels 51 52, mounted on rod 41. The toothed wheels 51 and 52 are so proportioned that the rotatable ring 48 with plate 35 is rotated with the same velocity as the reflecting-prism 1, whereas the body 47 with the erecting-prism 2 is rotated with half this velocity. From this it appears that the operation of this embodiment of the instrument is substantially the same as that described with reference to Fig. 7 of the drawings.

Having now particularly described and ascertained the nature of our said invention and in what manner the same is to be performed, we declare that what we claim is—

1. In a telescope for submarine and submergible boats, turrets and similar purposes the combination of at least one reflector inserted in the path of the rays and rotatably mounted and inclined to the axis-ray of the instrument a prism inserted in the path of the rays behind said reflector, means for moving said prism with half the angular velocity of said reflector, said prism being adapted to secure upright images for arbitrary positions of said pivoted reflector, at least one telescopical system in front of said rotatable prism and means arranged behind said prism adapted to collect the rays leaving said prism so as to produce an image of the object emitting said rays.

2. In a telescope for submarine and submergible boats, turrets and similar purposes the combination of a plurality of telescopical systems at least two of said telescopical systems being arranged so as to turn their elements of greater focal length toward each other, at least one reflector inserted in the path of the rays and rotatably mounted and inclined to the axis-ray of the instrument, a prism inserted between two of the telescopical systems and means for moving said prism with half the angular velocity of said reflector, said prism being adapted to secure upright images for arbitrary positions of the said pivoted reflector.

3. In a telescope for submarine and submergible boats, turrets and similar purposes the combination of three telescopical systems, said telescopical systems being in such relation to each other that two of same turn their elements of greater focal length toward each other, at least one reflector inserted in the path of the rays and rotatably mounted and inclined to the axis-ray of the instrument, a prism inserted between those two telescopical systems which do not turn their elements of greater focal length toward each other, and means for moving said prisms with half the angular velocity of said reflector, said prism being adapted to secure upright images for arbitrary positions of said pivoted reflector.

4. In a telescope for submarine and submergible boats, turrets and similar purposes the combination of a plurality of telescopical systems being arranged so as to turn their elements of greater focal length toward each other at least one reflector inserted in the path of the rays and rotatably mounted and inclined to the axis-ray of the instrument, a prism inserted between two of the telescopical systems and means for moving said prism with half the angular velocity of said reflector, said prism being adapted to secure upright images for arbitrary positions of the said pivoted reflector and at least one more reflector near the ocular of said submarine telescope adapted to refract the rays in a direction convenient for the observer.

5. In a telescope for submarine and submergible boats, turrets and similar purposes the combination of a plurality of telescopical systems and at least one reflector inserted in the path of the rays and inclined to the axis-ray of the instrument, a mantle-tube inclosing at the same time at least two of the telescopical systems, said reflector being mounted in non-rotatable relation with said mantle-tube, a prism-carrier and prism, the mantle-tube being provided with rotating means and adapted to rotate said prism-carrier with half of its own angular velocity, said prism being adapted to secure upright images for arbitrary positions of the said rotatable tube and reflector and at least one more reflector near the ocular of said submarine telescope adapted to refract the rays in a direction convenient for the observer.

6. In a telescope for submarine and submergible boats, turrets and similar purposes the combination of a plurality of telescopical systems at least one reflector inserted in the path of the rays and rotatably mounted and inclined to the axis-ray of the instrument, a carrier and a prism inserted between two of the telescopical systems and mounted in said carrier, a rod being provided with gears engaging said rotatable reflector and prism-carrier said gears being adapted to rotate the reflector with double the velocity of the prism-carrier.

7. In a telescope for submarine and submergible boats, turrets and similar purposes the combination of a plurality of telescopical systems at least one reflector inserted in the path of the rays and rotatably mounted and inclined to the axis-ray of the instrument, a transparent casing inclosing said reflector, a rotatable carrier, a prism inserted between two of the telescopical systems and mounted in said carrier, a rod being provided with gears engaging said rotatable reflector and prism-carrier, said gears being adapted to rotate the reflector with double the velocity of the prism-carrier and the gear-rod being water-tightly mounted in said tube substantially as and for the purposes described.

8. In a telescope the combination with an objective and an ocular of a reflector inserted in the path of the rays and rotatably mounted and inclined to the axis-ray of the instrument a prism likewise inserted in the path of the rays and mounted to be rotated in dependence upon the said rotatable reflector and to secure upright images for arbitrary positions of said reflector, a dial and an index adapted to be seen through said ocular and one of which being connected with the said rotatable reflector so as to be rotated the one with relation to the other.

9. In a telescope the combination with an objective and an ocular of a reflector inserted in the path of the rays and rotatably mounted and inclined to the axis-ray of the instrument a prism likewise inserted in the path of the rays and mounted to be rotated in dependence upon the said rotatable reflector and to secure upright images for arbitrary positions of said reflector a dial and an index adapted to be seen through said ocular and one of which is connected with the said rotatable reflector, the dial as well as the index being positioned in a focal plane of the instrument.

10. In a telescope the combination with an objective and an ocular of a reflector inserted in the path of the rays and rotatably mounted and inclined to the axis-ray of the instrument, a prism likewise inserted in the path of the rays and mounted to be rotated in dependence upon the said rotatable reflector and to secure upright images for arbitrary positions of said reflector a dial and an index adapted to be seen through said ocular and one of which is connected with the said rotatable reflector both the dial and the index being positioned in the focal plane of the ocular.

In testimony whereof we have signed this specification in the presence of two subscribing witnesses.

EDMUND NEUMAYER.
HEINRICH JACOB.

Witnesses:
HENRY HASPER,
WOLDEMAR HAUPT.